(12) United States Patent
Higashida et al.

(10) Patent No.: US 6,862,401 B1
(45) Date of Patent: Mar. 1, 2005

(54) RECORDING APPARATUS, METHOD AND PROGRAM RECORDING MEDIUM

(75) Inventors: Takashi Higashida, Kobe (JP); Hideki Takahashi, Kawanishi (JP); Kazuhiro Mihara, Moriguchi (JP); Yuji Tanigawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 884 days.

(21) Appl. No.: 09/711,613

(22) Filed: Nov. 13, 2000

(30) Foreign Application Priority Data

Nov. 12, 1999 (JP) .......................................... 11-323366

(51) Int. Cl.[7] ............................. H04N 7/04; H04N 7/64; H04N 5/85

(52) U.S. Cl. ........................ 386/100; 386/113; 386/125

(58) Field of Search .......................... 386/100, 46, 105, 386/106, 113, 114, 124, 125, 126, 1, 21, 39, 40, 45; H04N 7/04, 7/64, 5/85

(56) References Cited

FOREIGN PATENT DOCUMENTS

JP                410207788 A  *  8/1998

* cited by examiner

Primary Examiner—Robert Chevalier
(74) Attorney, Agent, or Firm—RatnerPrestia (57) ABSTRACT

A recording apparatus includes a recording device which records audio visual data (hereinafter referred to as "AV data") on a recording medium. A file restoration device which, when file management information for managing a file recorded on the recording medium is destroyed or lost while the recording means records the AV data, restores or generates the file management information so as to make it possible to access a portion of the AV data already recorded on the recording medium.

10 Claims, 9 Drawing Sheets

| directory 24 | | |
|---|---|---|
| FILE NAME 25 | TOP ADDRESS 26 | OVERWRITE ALLOWANCE 27 |
| PROGRAM 5 | 3 | N |

| FAT 38 | |
|---|---|
| ADDRESS 22 | NEXT ADDRESS 23 |
| 1 | -1 |
| 2 | -1 |
| 3 | 4 |
| 4 | 5 |
| 5 | 6 |
| 6 | 7 |
| 7 | EOF |
| 8 | -1 |
| 9 | -1 |
| 10 | -1 |
| 11 | -1 |
| 12 | -1 |

Fig. 5

39 RECORDING HISTORY

| FILE NAME | RECORDING START TIME | RECORDING END TIME | ADDRESS OF RECORDING BLOCK |
|---|---|---|---|
| PROGRAM 6 | 10:00:00 | — | 8 |

| FAT 29 | |
|---|---|
| ADDRESS | NEXT ADDRESS |
| 1 | 2 |
| 2 | EOF |
| 3 | 4 |
| 4 | 5 |
| 5 | 6 |
| 6 | 7 |
| 7 | EOF |
| 8 | -1 |
| 9 | 10 |
| 10 | 1 |
| 11 | -1 |
| 12 | -1 |

| directory 32 | | |
|---|---|---|
| FILE NAME 33 | TOP ADDRESS | OVERWRITE ALLOWANCE 35 |
| PROGRAM 4 | 9 | Y |
| PROGRAM 5 | 3 | N |

Fig. 8

36 RECORDING HISTORY

| FILE NAME | RECORDING START TIME | RECORDING END TIME |
|---|---|---|
| PROGRAM 6 | 10:00:00 | — |

Fig. 9

| FAT 50 | |
|---|---|
| ADDRESS 51 | NEXT ADDRESS 52 |
| 1 | 2 |
| 2 | EOF |
| 3 | 4 |
| 4 | 5 |
| 5 | 6 |
| 6 | 7 |
| 7 | EOF |
| 8 | -1 |
| 9 | 10 |
| 10 | 1 |
| 11 | -1 |
| 12 | -1 |

| directory 53 | | |
|---|---|---|
| FILE NAME 54 | TOP ADDRESS 55 | OVERWRITE ALLOWANCE 56 |
| PROGRAM 4 | 9 | Y |
| PROGRAM 5 | 3 | N |

RECORDING APPARATUS, METHOD AND PROGRAM RECORDING MEDIUM

BACKGROUND OF THE INVENTION

1. Field of the Invention

The present invention relates to a recording apparatus and method for recording AV data and a program recording medium.

2. Related Art of the Invention

A broadcasting station for BS broadcasting, CS broadcasting or the like broadcasts programs, using an MPEG2 transport-stream. A STB (Set Top Box; satellite broadcasting receiver) receives a broadcast wave carrying the programs, decodes AV data representing the programs, converts the AV data into analog data, and displays on a television monitor.

Further, as to a program among those which a viewer wishes to enjoy after the program is aired or watch repeatedly, after receipt by the STB, the program is transmitted to a recording apparatus, such as a hard disk device, through an IEEE1394 bus (IEEE standard for High performance Serial Bus described in IEEE1394-1995). The recording apparatus thus records transmitted programs one after another.

While the recording apparatus thus records AV data, the AV data are written in each recording block of a recording medium. The recording apparatus has, on its main memory, file management information which indicates which recording block stores the AV data. After recording of the AV data finishes, the recording apparatus writes the file management information in the recording medium.

Figure 9:
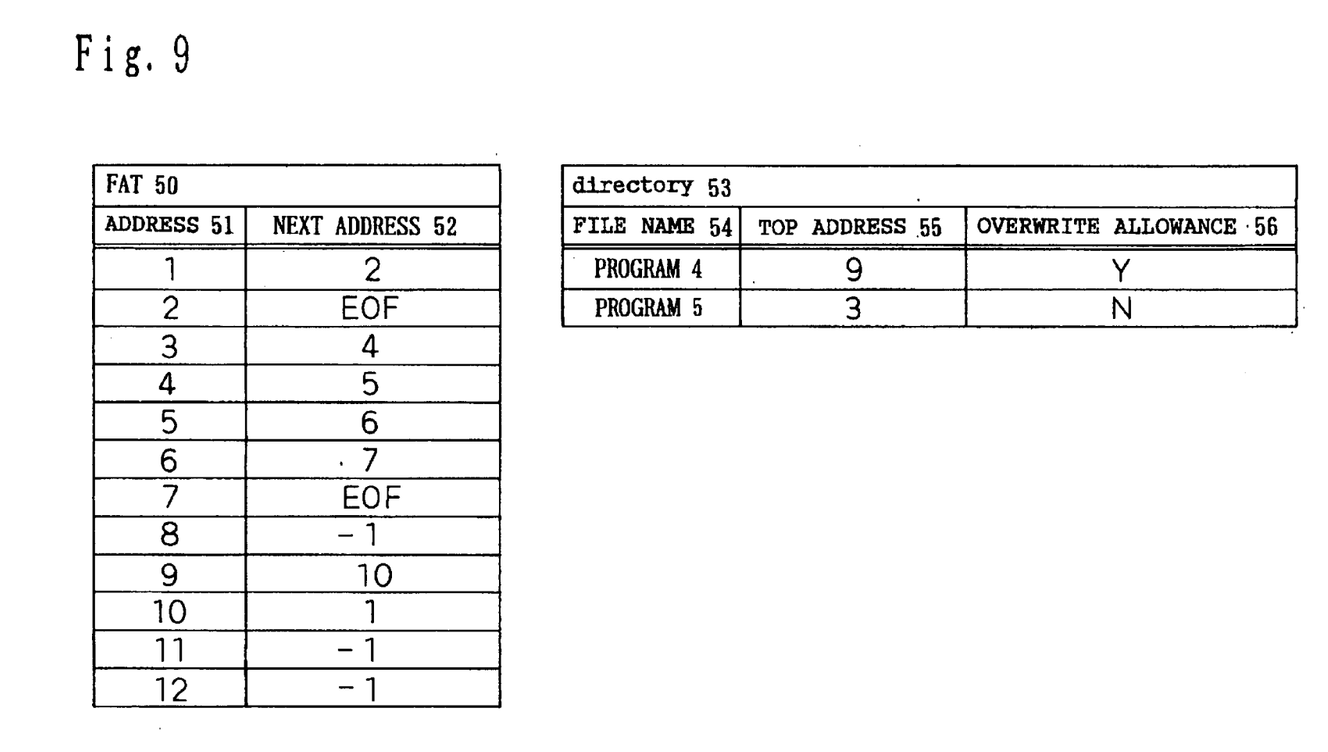
FIG. 9 is a drawing showing an example of conventional file management information.

FIG. 9 shows an example of the file management information. Shown in FIG. 9 is file management information which is used in MS-DOS, Windows, etc. In the example in FIG. 9, there are twelve recording blocks, for the ease of understanding. In reality, there are a commensurable number of recording blocks to a storage capacity of a hard disk.

The file management information consists of information called an FAT (file allocation table) 50 and information called a directory 53.

The FAT 50 is a table in which addresses 51, which are addresses of the recording blocks, and Next addresses 52, which are addresses of the next recording blocks, are paired so as to indicate in which order data of files are stored in which recording blocks.

Meanwhile, the directory 53 is a table for managing files hierarchically, which pairs up file names 54, top addresses 55, which are addresses of top recording blocks which hold the data of the files, and overwrite allowance 56 which denote attributes which represent whether the files are writable only or overwritable, etc.

Using the FAT 50 and the directory 53, it is possible to manage processes such as creation, editing, deletion of files, etc.

That is, in a conventional recording apparatus, most recent file management information on a main memory is recorded in a recording medium after AV data are recorded on the recording medium.

By the way, if power supply to recording apparatus is cut off during recording of AV data, etc., file management information on a main memory is deleted before it is written in a recording medium. This makes it impossible to tell in which portion of the recording medium a portion already recorded of the AV data is recorded, and hence, to access the portion already recorded.

That is, when the file management information is destroyed or lost during recording of the AV data, it is not possible to access the portion of the AV data already recorded on the recording medium.

SUMMARY OF THE INVENTION

Considering the problem that it is not possible to access a portion of AV data already recorded on a recording medium if file management information is destroyed or lost during recording of the AV data, the present invention aims to provide a recording apparatus method and a program recording medium with which it is possible to restore file management information so that when the file management information is destroyed or lost during recording of AV data, a portion of the AV data already recorded on the recording medium can be accessed.

One aspect of the present invention is a recording apparatus which is characterized in comprising:

recording by recording means which records audio visual data (hereinafter referred to as "AV data") on a recording medium; and file restoration means which, when file management information for managing a file recorded on said recording medium is destroyed or lost while said recording means records said AV data, restores or generates said file management information so as to make it possible to access a portion of said AV data already recorded on said recording medium.

Another aspect of the present invention is a recording apparatus in, characterized in that said recording means records on said recording medium an address of a top recording block in which said-AV data are to be recorded, at the start of recording of said AV data, said AV data are recorded in continuous recording blocks of said recording medium, and when said file management information for managing a file recorded on said recording medium is destroyed or lost during recording of said AV data on said recording medium, said file restoration means recreates said portion already recorded based on the address of said top recording block, finds a discontinuous point, and restores or generates said file management information.

Still another aspect of the present invention is a recording apparatus, characterized in that said recording means records said AV data in discontinuous recording blocks of said recording medium, and when said file management information for managing a file recorded on said recording medium is destroyed or lost during recording of said AV data on said recording medium, said file restoration means recreates said portion already recorded utilizing old file management information which is recorded on said recording medium, finds a discontinuous point, and restores or generate management information.

Yet another aspect of the present invention is a recording apparatus characterized in that there is a predetermined rule regarding an order of writing in recording blocks for the purpose of writing said AV data in recording blocks of said recording medium, and said file restoration means recreates said portion already recorded utilizing said rule.

Still yet another aspect of the present invention is a recording apparatus, characterized in that said AV data are in compliance with MPEG, and said discontinuous point is a place where a value of PCR (Program Clock Reference) is discontinuous.

A further aspect of the present invention is a recording apparatus, characterized in that said AV data are in compliance with MPEG, and said discontinuous point is a place where a value of PID (Packet Identification) is discontinuous.

A still further aspect of the present invention is a recording apparatus characterized in that said recording medium is a hard disk.

A still yet further aspect of the present invention is a program recording medium which is characterized in that said program recording medium is readable with a computer, and that said program recording medium stores a program which allows a computer to execute all or some functions of all or some means of a recording apparatus.

DESCRIPTION OF SYMBOLS 1 recording apparatus
2 STB
3 antenna
4 monitor
5 IEEE1394 bus
6 IEEE1394 I/F
7 recording/reproducing control means
8 hard disk
9 continuity information detecting means
10 discontinuous point detecting means
11 CPU
12 memory
13 file management information
24 directory
28 recording/reproducing control means
38 FAT

PREFERRED EMBODIMENTS OF THE INVENTION

In the following, embodiments of the present invention will be described with reference to drawings.

(First Embodiment)

First, a first embodiment will be described.

Figure 1:
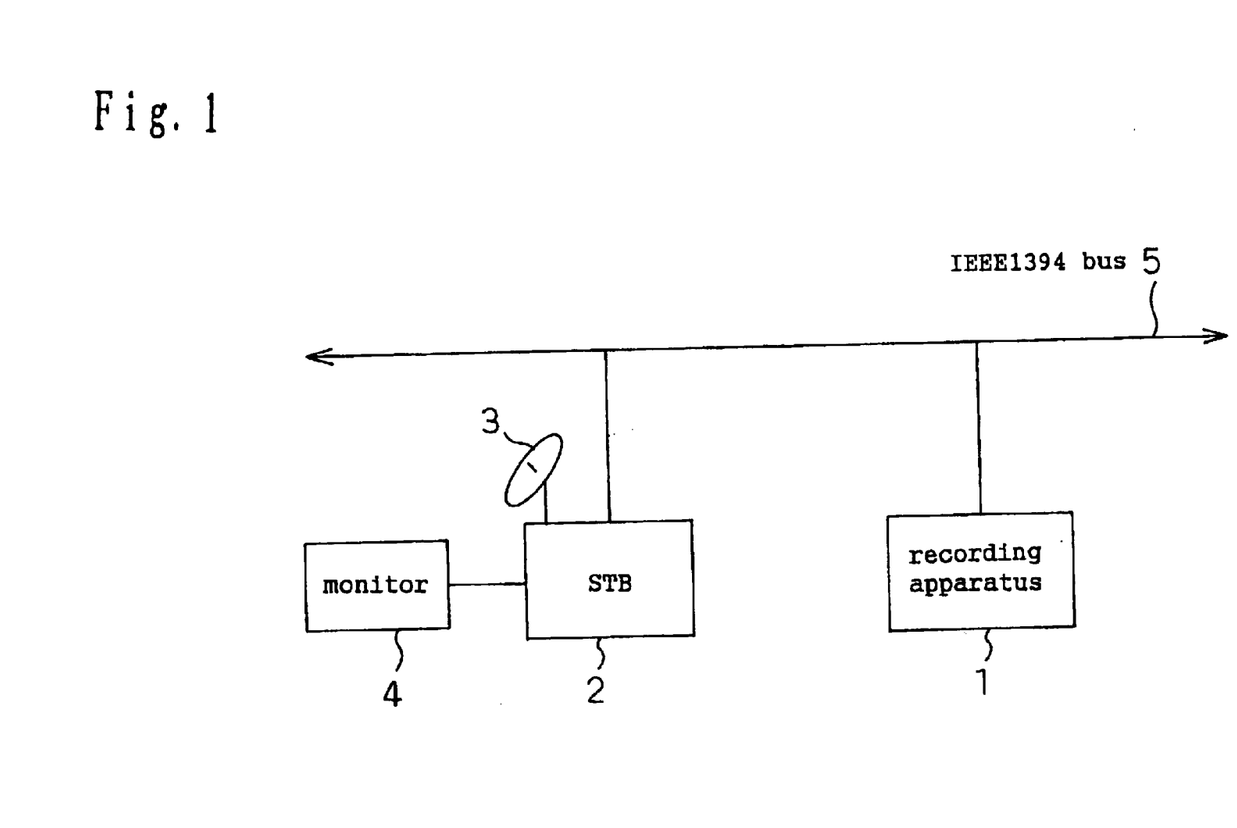
FIG. 1 is a block diagram showing a structure of the apparatus according to the first embodiment of the present invention.

FIG. 1 shows a structure of an apparatus according to the first embodiment.

A recording apparatus 1 and a STB 2 are connected to an IEEE139 bus 5. Further, an antenna 3 and a monitor 4 are connected to the STB 2.

The IEEE1394 bus 5 is an IEEE standard for High performance Serial Bus described in IEEE1394-1995. The recording apparatus 1 is an apparatus which records AV data and reproduces the recorded AV data. The STB 2 is a set top box (satellite broadcasting receiver) which receives a broadcast wave sent from a broadcasting station, decodes it and displays it on the monitor 4, or decodes AV data sent on the IEEE1394 bus 5 and displays the data on the monitor 4, or transmits AV data received from a broadcasting station to the IEEE1394 bus 5.

In the first embodiment, AV data processed by the recording apparatus 1, STB 2 and the like are transmitted as an MPEG2 transport stream. MPEG is an abbreviation of Motion Picture Expert Group, and MPEG2 refers to the standard promulgated by ISO/IEC under the standard number 13818.

Figure 2:
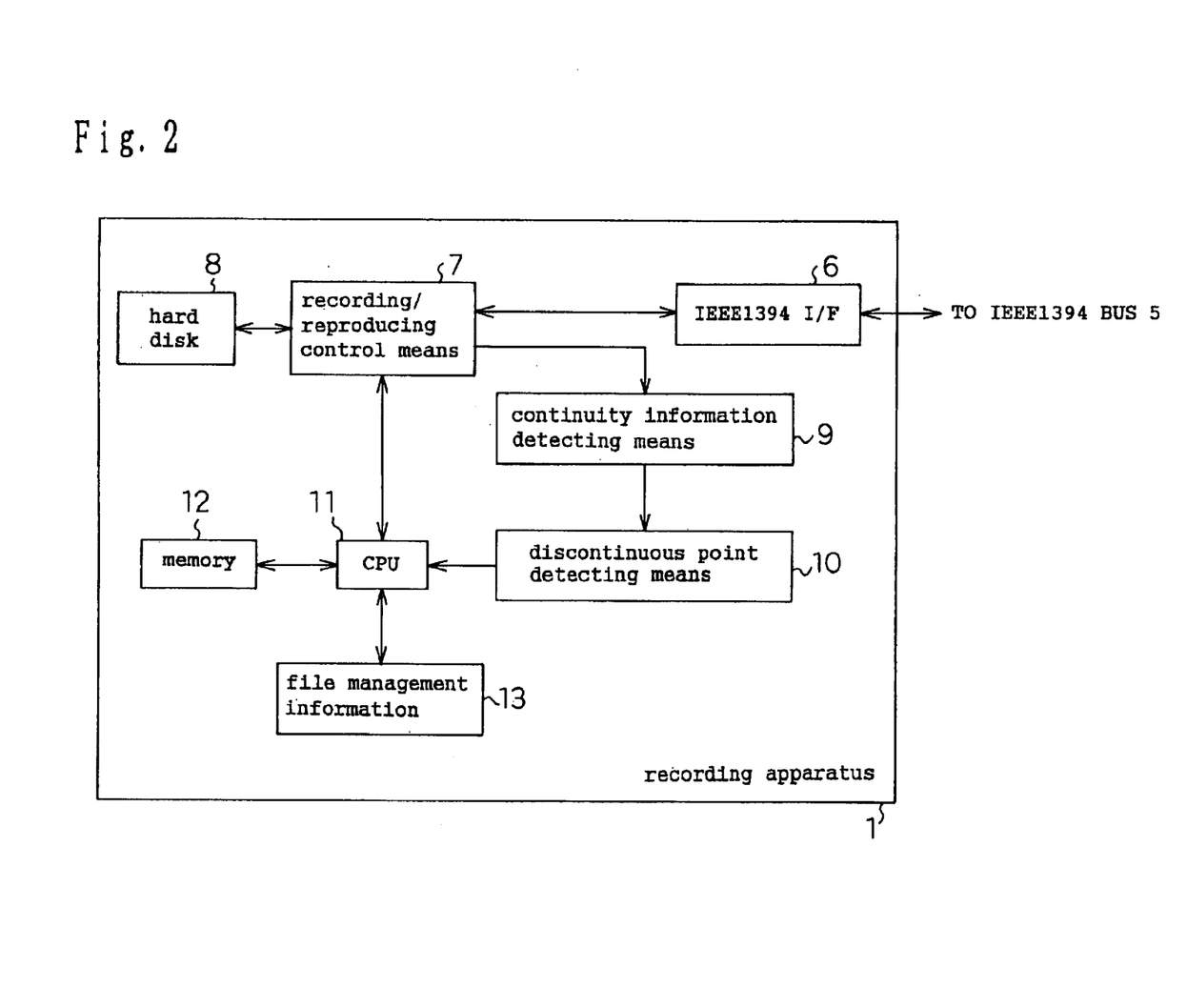
FIG. 2 is a block diagram showing a structure of the recording apparatus according to the first embodiment of the present invention.

FIG. 2 shows a structure of the recording apparatus 1.

The recording apparatus 1 comprises an IEEE1394 I/F 6, recording/reproducing control means 7, a hard disk 8, continuity information detecting means 9, discontinuous point detecting means 10, a CPU 11, a memory 12, and file management information 13.

The IEEE1394 I/F 6 is an interface for sending and receiving a command, data and the like through the IEEE1394 bus 5. A command is sent and received by asynchronous transmission, while data are sent and received by isochronous transmission which is called "isochronous transmission."

The recording/reproducing control means 7 is means which converts AV data which are outputted as an MPEG2 transport stream sent from the IEEE1394 I/F 6 into a recording format and records the data in the hard disk 8, or reads recorded AV data from the hard disk 8 and outputs the data after converting the data into an MPEG2 transport stream. The recording/reproducing control means 7 also serves as means which reads data of the file management information 13 from the hard disk 8 and records such data.

The hard disk 8 is a hard disk device for recording AV data as a file.

The continuity information detecting means 9 is means which extracts PCR (Program Clock Reference) from AV data which are outputted as an MPEG2 transport stream from the recording/reproducing control means 7.

The discontinuous point detecting means 10 is means which examines a value of detected PCR and finds a place where the value largely changes, to thereby detect the end of AV data.

The CPU 11 is means which creates and updates the file management information and supplies an instruction to the recording/reproducing control means 7.

The memory 12 is an SD-RAM which stores a program, data and the like to be executed by the CPU 11.

The file management information 13 is information which tells in which order data are stored in which recording blocks of the hard disk 8 as files.

Figure 4:
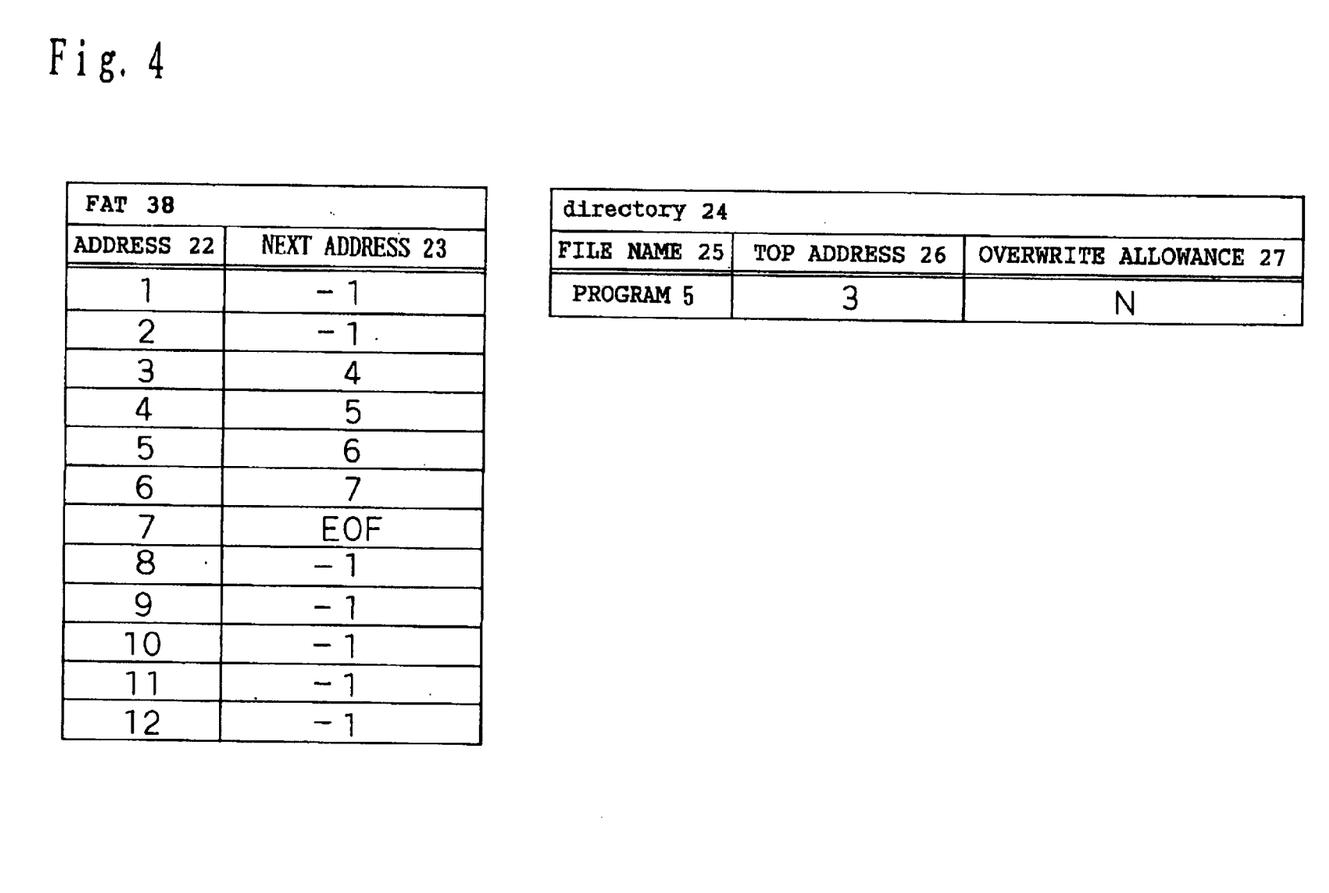
FIG. 4 is a drawing showing an example of file management information in the first embodiment of the present invention.

FIG. 4 shows an example of the file management information 13. Shown in FIG. 4 is file management information which is used in MS-DOS, Windows, etc. In the example in FIG. 4, there are twelve recording blocks, for the ease of understanding. In reality, there are a commensurable number of recording blocks to a storage capacity of a hard disk.

The file management information consists of information called an FAT (file allocation table) 38 and information called a directory 25.

The FAT 38 is a table in which-addresses 22, which are addresses of the recording blocks, and Next addresses 23, which are addresses of the next recording blocks, are paired so as to indicate in which order data of files are stored in which recording blocks. A recording block whose Next address 23 is –1 is not associated with a further recording block to jump to, which means that the recording block is free. EOF denotes the end of a file.

Meanwhile, the directory 24 is a table for managing files hierarchically, which pairs up file names 25, top addresses 26, which are addresses of top recording blocks which hold the data stored in the files, and overwrite allowance 27 which denote attributes which represent whether the files are writable only or overwritable, etc.

The recording/reproducing control means 7 according to the first embodiment is an example of the recording means of the present invention. The continuity information detecting means 9, the discontinuous point detecting means 10 and the CPU 11 according to the first embodiment are an example of the file restoration means.

Next, operations according to such an embodiment will be described.

First, a description will be given on an operation that the STB 2 receives AV data sent from a broadcasting station while the recording apparatus 1 records.

The AV data are transmitted on a broadcast wave in the MPEG2 transport stream format from a broadcasting station.

At the outset, a user operates and sets up the STB 2 to record a program.

In response, utilizing asynchronous transmission, the STB 2 sends a command which instructs the recording apparatus 1 to start recording. The command contains a channel number, too, of a channel in which AV data to be recorded are transmitted.

Receiving the command demanding to start recording, the recording apparatus 1 prepares to start recording.

That is, the CPU 11 instructs the recording/reproducing control means 7 to read the file management information 13 which is recorded in the hard disk 8. In response, the recording/reproducing control means 7 reads the file management information 13. A CPU 11 temporarily stores the retrieved file management information 13 in the memory 12.

The file management information 13 is stored in the hard disk 8. For recording of data, the file management information 13 is read to the memory 12 and updated. Upon recording of data, the file management information 13 is recorded in the hard disk 8 once again.

The file management information temporarily stored in the memory 12 is as shown in FIG. 4, for instance. Based on such file management information 13, the CPU 11 determines a recording block to start recording AV data.

In the example shown in FIG. 4, recording of the AV data is started in the recording block whose address 22 is 8.

The CPU 11 instructs the recording/reproducing control means 7 to record the address of this recording block in the hard disk 8. Further, the CPU 11 instructs the recording/reproducing control means 7 to write also the time at which recording of the AV data was started in the hard disk 8.

Still further, the CPU 11 registers the address of this recording block in the file management information 13 as well. The recording/reproducing control means 7 records the address of this recording block and the recording start time in the hard disk, as recording history.

Figure 5:
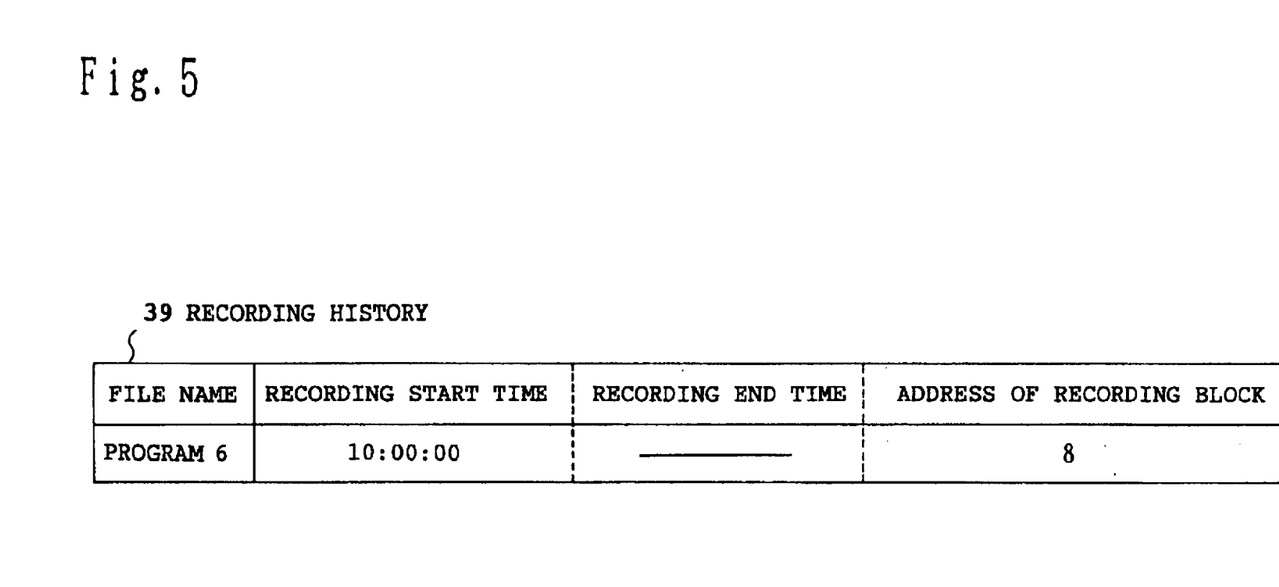
FIG. 5 is a drawing showing an example of recording history in the first embodiment of the present invention.

FIG. 5 shows an example of recording history. In FIG. 5, recording history 39 is a file name, recording start time, recording end time and an address of a recording block as they are grouped as a set. Shown in FIG. 5 is that recording of AV data is to start in the recording block whose address is 8 under the file name of "Program 6" at "10:00:00 in 1999." The recording/reproducing control means 7 records such recording history 39 in the hard disk 8 immediately before recording of AV data starts. The recording history 39, the file management information 13 and the like are written in a system area which is ensured separately from a user area in which AV data are recorded. If recording of AV data ends normally, the CPU 11 and the recording/reproducing control means 7 add the time when recording ended to the recording history 39 which is recorded in the hard disk 8. In FIG. 5, the recording end time is vacant since recording of the AV data is not yet completed.

Meanwhile, the IEEE1394 I/F 6 waits for an isochronous packet to be transmitted from the IEEE1394 bus 5 in the channel which is assigned with the channel number which is added to the command.

Next, an STB 2 receives AV data sent from a broadcasting station, and utilizing isochronous transmission, serially transmits the AV data to the IEEE1394 bus 5.

Recognizing the channel number, the IEEE1394 I/F6 receives AV data which are sent from the IEEE1394 bus 5 as isochronous packets, and serially outputs the AV data as an MPEG2 transport stream.

The recording/reproducing control means 7 converts the AV data which are sent as the MPEG2 transport stream into a format for recording, and writes the AV data in a predetermined recording block. As described earlier, the AV data are written in this recording block, first. The address of this recording block is recorded in the hard disk 8.

As all of the AV data is written in this recording block, referring to the file management information 13, the CPU 11 determines a recording block to write the AV data next. The next recording block is then registered in the file management information 13.

In the example shown in FIG. 4, "9" assigned to the recording block to write the AV data next is written in the Next address 23 of the recording block whose address 22 is B.

In the first embodiment, the recording apparatus 1 writes AV data in continuous recording blocks inside the hard disk 8.

As all of the AV data is written in this recording block, the CPU 11 instructs the recording/reproducing control means 7 to write AV data in a continuous subsequent recording block. Meanwhile, address of the next recording block is registered in the file management information 13. After converting the AV data into the recording format, the recording/reproducing control means 7 writes the AV data in the next recording block.

In this manner, the AV data are written in the continuous recording blocks inside the hard disk 8 one after another, while the addresses of the recording blocks in which the AV data are being written are registered in the file management information 13 one after another.

By the way, assume that a user turns off a power source switch of the recording apparatus 1. For example, the user turns off the power source switch of the recording apparatus 1 after recording for one hour a program which is to be aired for two hours. At this stage, the hard disk 8 holds AV data covering one hour.

However, it is the memory 12 that stores the file management information 13 which contains addresses of recording blocks in which the AV data are recorded. As the power source switch is turned off, all of the contents on the memory is lost. Since all of the information regarding the addresses of the recording blocks holding the one-hour AV data is deleted upon power off, it is not possible to reproduce the one-hour AV data recorded in the hard disk 8 any more.

In other words, this is destruction of a file representing the recorded AV data. A seemingly appropriate solution to avoid such a situation is to update the file management information 13 which is stored in the hard disk 8 every time AV data are recorded in a new recording block. To this end, it is necessary to write the file management information 13 in the hard disk 8 while concurrently writing the AV data in the hard disk 8. However, simultaneous recording of the file management information 13 and the AV data incurs very large overhead. This therefore makes it impossible to continuously record the AV data.

The recording apparatus 1 according to the first embodiment has a function of restoring a destroyed file in which AV data are recorded in the manner above, to allow normal reproduction of the AV data.

Next, an operation that the recording apparatus 1 restores a file destroyed in the manner above will be described.

Assume that a user turns on the power source switch of the recording apparatus 1. In response, the CPU 11 reads the file management information 13 which is recorded in the hard disk 8 through the recording/reproducing control means 7, and stores the file management information 13 in the memory 12.

The file management information 13 read in this manner, as shown in FIG. 4, does not reflect information regarding destroyed AV data at all.

Further, the recording history 39 recorded in the hard disk 8 is examined through the recording/reproducing control means 7, to thereby check whether there is a file to which the recording end time is not added. As to AV data having no recording end time added, a file corresponding to the AV data is found to be a file whose AV data are destroyed.

From the recording history 39 as to the AV data which were not recorded normally as the power source switch was turned off, the recording/reproducing control means 7 learns about an address of a top recording block holding the AV data and reproduces that piece of the AV data.

The CPU 11 registers addresses of recording blocks in which AV data are being reproduced are stored, one after another in the file management information 13. As described earlier, the AV data are recorded in the continuous recording blocks, and hence, if the top recording block is identified, the AV data can be reproduced. However, it is not possible to know up to which recording block the AV data are recorded.

Noting this, the continuity information detecting means 9 checks transport packets of the AV data reproduced by the recording/reproducing control means 7 as an MPEG2 transport stream, and when there is a transport packet added with PCR, extracts PCR from that transport packet. The continuity information detecting means 9 thereafter passes the detected PCR to the discontinuous point detecting means 10.

Now, PCR will be briefly described. PCR is time of day information which is added on the encoder side in order to set or construct STC (System Time Clock) which is synchronization information which serves as the reference for decoding video and audio. In MPEG2, PCR is expressed in 42 bits and counted at a frequency of 27 MHz, and therefore, it is possible to count for 26.5 hours. PCR is added to transport packets at intervals up to 100 ms. PCR is added to a header portion of a transport packet. It is possible to tell whether PCR is added, from adaptation field control in a header of a transport packet and a 5-flag.

The discontinuous point detecting means 10 compares the PCR detected by the continuity information detecting means 9 with previously detected PCR. When a comparison value is smaller than a change which would be created if PCR is transmitted for every 100 ms, the discontinuous point detecting means 10 determines that AV data heretofore are continuous. When the comparison value is larger than the change which would be created if PCR is transmitted for every 100 ms, the discontinuous point detecting means 10 determines that the transport packet with the added PCR represents different AV data. In short, the discontinuous point detecting means 10 determines that reproduction went beyond the end of the AV data which were being reproduced.

Figure 3:
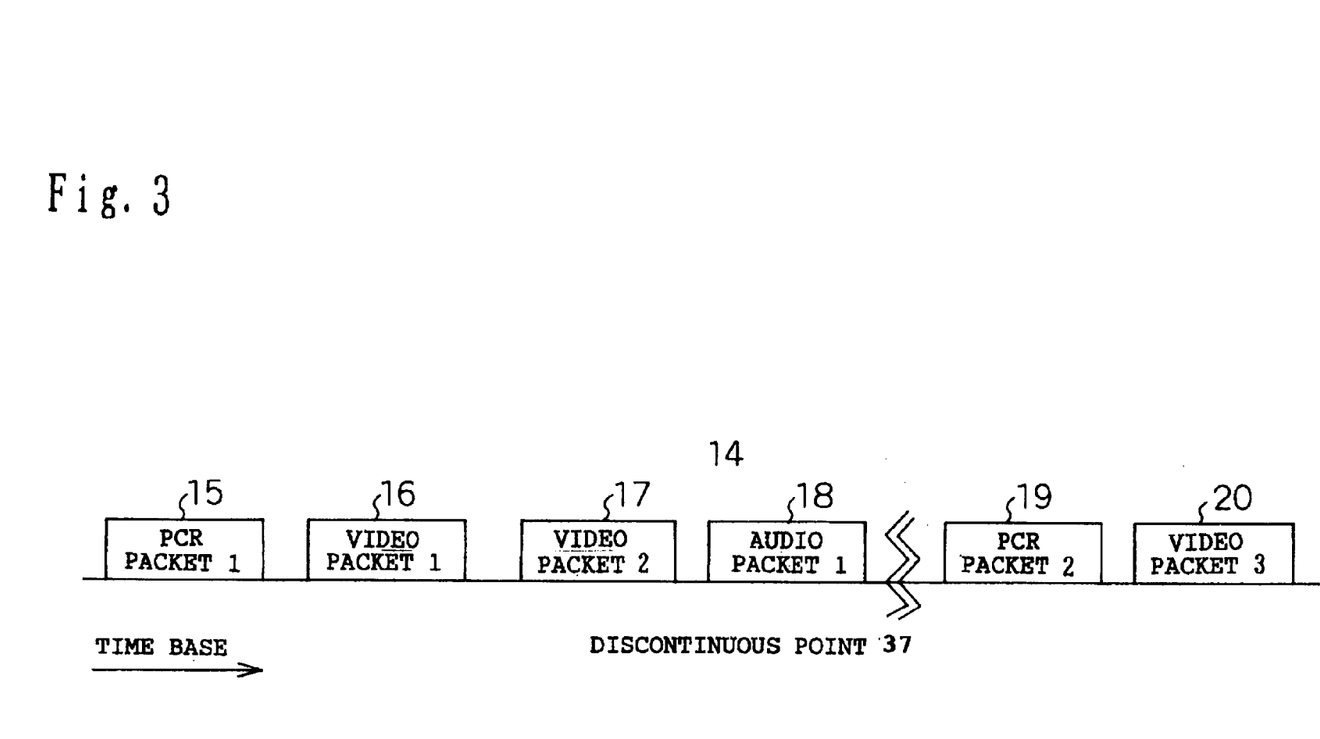
FIG. 3 is a drawing for describing a method of detecting a discontinuous point in AV data according to the first embodiment of the present invention.

FIG. 3 shows an example of transport packets. Assume that AV data are continuous up to a PCR packet 1 (15) bearing PCR and that there is a large difference in value between PCR added to the next PCR-bearing packet 2 (19) and the PCR of the PCR packet 1 (15). This tells that among the AV data, a different set of AV data starts somewhere in a video packet 1 (16), a video packet 2 (17) and an audio packet 1 (18).

When the discontinuous point detecting means 10 determines reproduction went beyond the end of the AV data in this manner, the discontinuous point detecting means 10 notifies the CPU 11 of a recording block which holds the transport packet which bears the previous PCR so that it is known the AV data are continuous for sure and of a recording position in the recording block. In the example shown in FIG. 3, the AV data are surely continuous up to the PCR packet 1 (15).

The CPU 11 leaves the addresses up to that of the recording block above in the file management information. If there is an address recorded of a further recording block, the CPU 11 deletes the address and adds information which indicates that the file ends at the recording position advised from the discontinuous point detecting means 10.

Further, the CPU 11 instructs the recording/reproducing control means 7 to stop reproducing the AV data. In response, the recording/reproducing control means 7 stops reproducing the AV data.

At last, the CPU 11 records the file management information 13 on the memory in the hard disk through the recording/reproducing control means 7. The recording end time is presumed from the recording start time, and the presumed recording end time is written in the recording history.

In this manner, it is possible to restore a destroyed file in which AV data are recorded.

If AV data are recorded repeatedly in the hard disk 8 or recorded AV data are deleted repeatedly, continuous free areas for recording AV data in the hard disk 8 decrease. As this occurs, the CPU 11 relocates recording blocks for recording AV data in such a manner that as large continuous free areas as possible are ensured in the hard disk 8.

In the following, an operation for rearranging recording blocks will be described.

Assume that the recording apparatus 1 is instructed to rearrange recording blocks for recording AV data. Such an instruction is provided by operating an operation panel not shown of the recording apparatus 1.

The CPU 11 reads the file management information 13 from the hard disk 8 through the recording/reproducing control means 7, and stores the file management information 13 in the memory 12.

The recording blocks holding files are thereafter relocated with reference to the file management information 13. When a recording block holding a file is changed, the CPU 11 rewrites the file management information 13 regarding the modified file.

This process is performed on all files, upon completion of which the CPU 11 reads the file management information 13 from the memory 12 and records the file management information 13 in the hard disk 8 through the recording/reproducing control means 7.

Since this process takes time, the process may be executed automatically using a timer of the operation panel and setting the timer. More precisely, the power source switch of the recording apparatus 1 is turned on automatically in a time zone designated by the timer, e.g., midnight when a user does not use the recording apparatus 1, the recording blocks are relocated, and the power source switch of the recording apparatus 1 is turned off automatically upon completion of the process. Such rearrangement of recording blocks, however, is executable only when there is no destroyed file. If there is a destroyed file, recording blocks are relocated after restoring the file management information 13.

As described above, according to the first embodiment, an address of a recording block to start recording AV data is recorded in the hard disk 8 in advance prior to recording of the AV data. Even when the file management information 13 regarding the AV data is lost, the AV data are reproduced based on the address of the recording block in which the AV data were recorded first, and the end point of the AV data is detected in accordance with whether a PCR value is continuous, so that it is possible to restore or generate the file management information 13.

(Second Embodiment)

Next, a second embodiment will be described.

FIG. 1 shows a structure of an apparatus according to the second embodiment. The structure of the apparatus according to the second embodiment is identical to that of the first embodiment.

Figure 6:
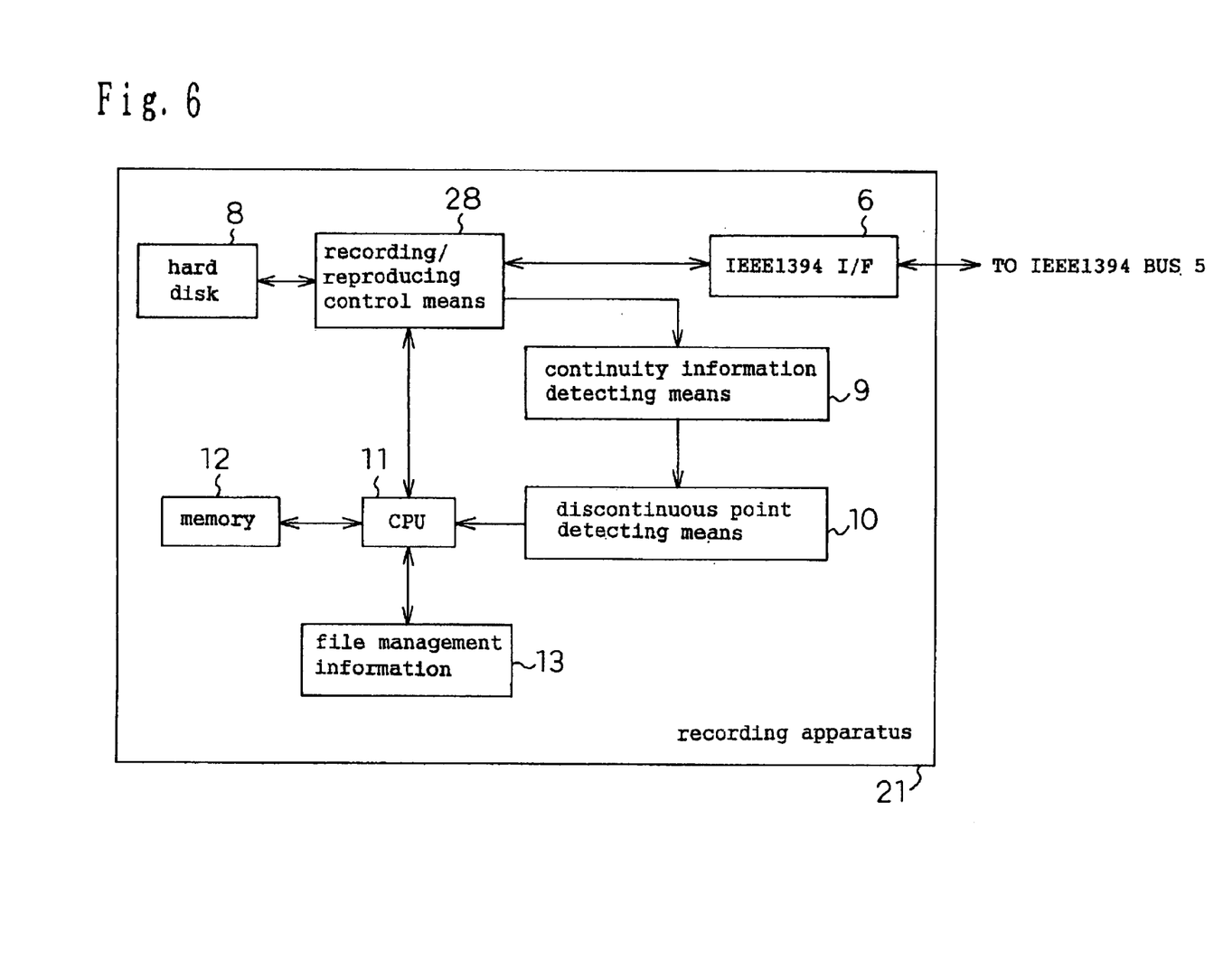
FIG. 6 is a block diagram showing a structure of the recording apparatus according to the second embodiment of the present invention.

FIG. 6 shows a structure of a recording apparatus 21 according to the second embodiment. The recording apparatus 21 is different from the recording apparatus 1 according to the first embodiment, in comprising recording/reproducing control means 28 instead of the recording/reproducing control means 7.

The recording/reproducing control means 28 is means which writes AV data in recording blocks which are not necessarily continuous to each other, unlike in the first embodiment.

The structure is unless otherwise the same as that of the first embodiment, and therefore, will not be described further.

The recording/reproducing control means 28 according to the second embodiment is an example of the recording means of the present invention. The continuity information detecting means 9, the discontinuous point detecting means 10 and the CPU 11 according to the first embodiment are an example of the file restoration means.

Now, operations according to the second embodiment will be described, mainly on differences from the first embodiment.

First, a description will be given on an operation that the STB 2 receives AV data sent from a broadcasting station while the recording apparatus 21 records the AV data.

The operation is the same as that in the first embodiment, up to receipt by the recording apparatus 21 of the command for start recording.

The recording apparatus 21 prepares to start recording.

Figure 7:
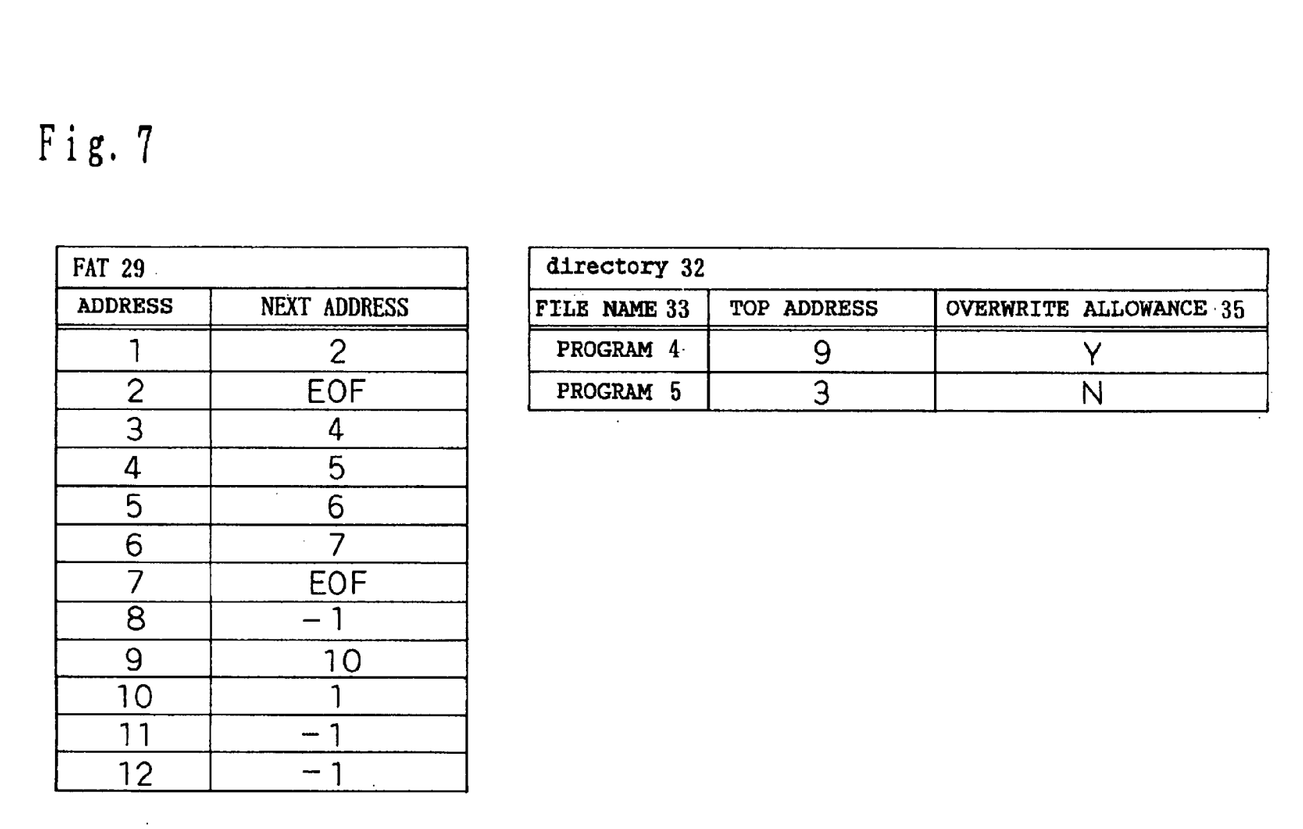
FIG. 7 is a drawing showing an example of file management information in the second embodiment of the present invention.

More particularly, the CPU 11 instructs the recording/reproducing control means 28 to read the file management information 13 which is recorded in the hard disk 8. In response, the recording/reproducing control means 28 reads the file management information 13. A CPU 11 temporarily stores the retrieved file management information 13 in the memory 12. The file management information 13 read into the memory 12 is as shown in FIG. 7, for instance.

The file management information 13 consists of an FAT 29 and a directory 32, as in the first embodiment. Unlike in the first embodiment, recording blocks in which AV data are recorded are not continuous to each other.

Referring to the file management information 13, the CPU 11 determines a recording block to record AV data in. At this stage, unlike in the first embodiment, the CPU 11 does not record an address of this recording block in the hard disk 8. The CPU 11 records the address of this recording block in the file management information 13. Further, the CPU 11 instructs the recording/reproducing control means 28 to write also the time at which recording of the AV data was started in the hard disk 8. The recording/reproducing control means 28 records the recording start time in the hard disk as recording history.

Figure 8:
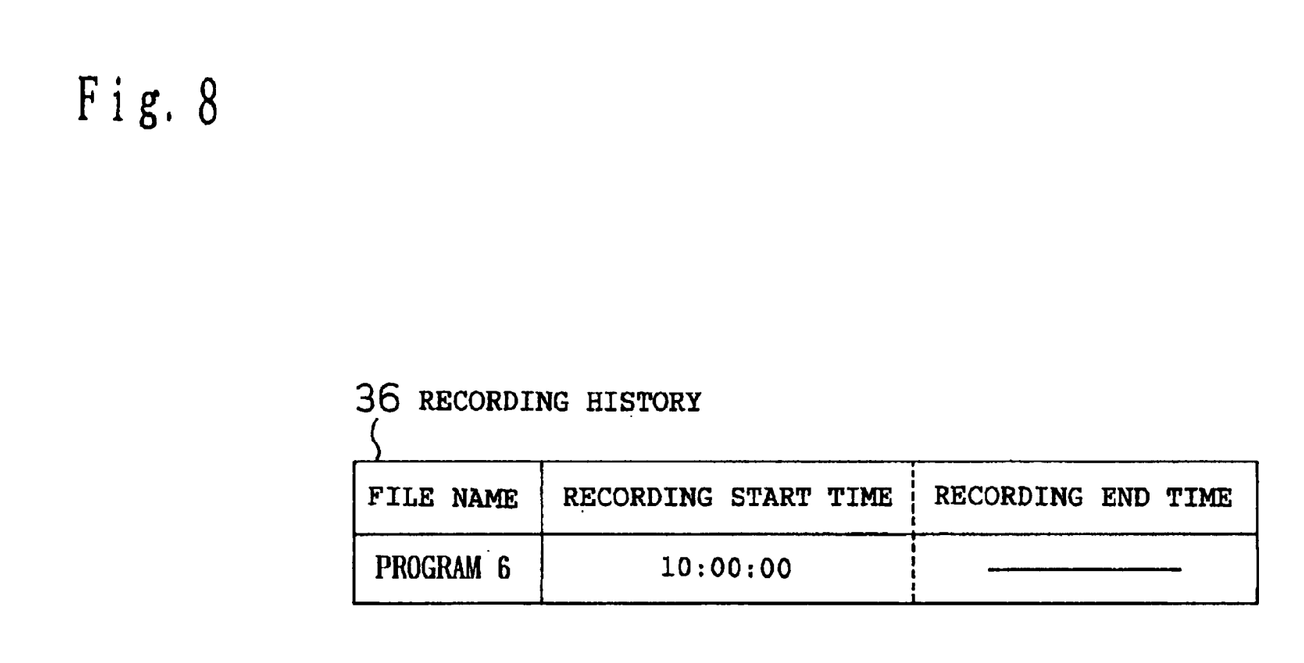
FIG. 8 is a drawing showing an example of recording history in the second embodiment of the present invention.

FIG. 8 shows recording history 36. The recording history 136 is written in a system area in the hard disk 8 which is ensured separately from a user area in which AV data are recorded. If recording of AV data ends normally, the CPU 11 and the recording/reproducing control means 28 add the time when recording ended to the recording history 36 which is recorded in the hard disk 8.

Meanwhile, the IEEE1394 I/F 6 waits for an isochronous packet to be transmitted from the IEEE1394 bus 5 in the channel which is assigned with the channel number which is added to the command.

Next, an STB 2 receives AV data sent from a broadcasting station, and utilizing isochronous transmission, serially transmits the AV data to the IEEE1394 bus 5.

Recognizing the channel number, the IEEE1394 I/F 6 receives AV data which are sent from the IEEE1394 bus 5 as isochronous packets, and serially outputs the AV data as an MPEG2 transport stream.

The recording/reproducing control means 28 converts the AV data which are sent as the MPEG2 transport stream into a format for recording, and writes the AV data in a predetermined recording block.

As all of the AV data is written in this recording block, referring to the file management information 13, the CPU 11 determines a recording block to write the AV data next. The next recording block is then registered in the file management information 13.

In the second embodiment, the recording apparatus 21 writes AV data in free recording blocks in the hard disk 8. Recording blocks to write the AV data in are not necessarily continuous to each other, unlike in the first embodiment.

As all of the AV data is written in this recording block, the CPU 11 instructs the recording/reproducing control means 28 to write the AV data in the next recording block. Meanwhile, an address of the next recording block is registered in the file management information 13. After converting the AV data into the recording format, the recording/reproducing control means 28 writes the AV data in the next recording block.

In this manner, the AV data are written in the recording blocks which are not necessarily continuous to each other of the hard disk 8 one after another, while the addresses of the recording blocks in which the AV data are being written are registered in the file management information 13 one after another.

By the way, assume that a user turns off a power source switch of the recording apparatus 21 as in the first embodiment. This destroys a file of the AV data which are being recorded.

The recording apparatus 21 according to the second embodiment has a function of restoring a destroyed file in which AV data are recorded in the manner above, to allow normal reproduction of the AV data.

Next, an operation that the recording apparatus 21 restores a file destroyed in the manner above will be described.

Assume that a user turns on the power source switch of the recording apparatus 21. In response, the CPU 11 reads the file management information 13 which is recorded in the hard disk 8 through the recording/reproducing control means 28, and stores the file management information 13 in the memory 12.

The file management information 13 read in this manner, as shown in FIG. 7, does not reflect information regarding destroyed AV data at all.

Further, the recording history 36 recorded in the hard disk 8 is examined through the recording/reproducing control means 28, to thereby check whether there is a file to which the recording end time is not added. As to AV data having no recording end time added, a file corresponding to the AV data is found to be a file whose AV data are destroyed.

With reference to the file management information 13, the recording/reproducing control means 28 learns about a top one of recording blocks holding the destroyed piece of the AV data, utilizing a rule stipulating which recording blocks are to hold AV data.

That is, assume the file management information 13 is as shown in FIG. 7. The file management information 13 denotes a state of the hard disk 8 as it was immediately before the destroyed piece of the AV data were recorded. Hence, the file management information 13 tells that the next recording block to write is the top block which holds the destroyed piece of the AV data.

The rule regarding an order of writing data in recording blocks may be such a rule that data are written one by one in free recording blocks starting with those blocks having smaller addresses and proceeding to those blocks having larger addresses, and a file 33 which is denoted as overwritable by overwrite allowance 35 is then overwritten. In accordance with such a rule, it is possible to trace back recording blocks which hold AV data.

Utilizing such a rule, the recording/reproducing control means 28 learns about addresses of recording blocks which hold AV data and reproduces the AV data.

The CPU 11 registers addresses of recording blocks which hold currently reproduced AV data one after another in the file management information 13. However, it is not known where the end point of the AV data is, i.e., to which recording block recording has progressed.

The continuity information detecting means 9 and the discontinuous point detecting means 10, as in the first embodiment, detect an end of the AV data.

The CPU 11 leaves the addresses up to that of the recording block which is at the end in the file management information. If there is an address recorded of a further recording block, the CPU 11 deletes the address and adds information which indicates that the file ends at a recording position advised from the discontinuous point detecting means 10.

Further, the CPU 11 instructs the recording/reproducing control means 28 to stop reproducing the AV data. In response, the recording/reproducing control means 28 stops reproducing the AV data.

At last, the CPU 11 records the file management information 13 on the memory in the hard disk through the recording/reproducing control means 27. The recording end time is presumed from the recording start time, and the presumed recording end time is written in the recording history 36.

While the recording apparatus 21 according to the second embodiment rearranges recording blocks, since this is similar to that in the first embodiment, a description will be omitted.

In this manner, it is possible to restore a destroyed file.

Although the foregoing has described that the file management information 13 is restored or generated if the recording apparatus detects a destroyed file after the power source switch of the recording apparatus is turned on in each embodiment, this is not limiting. Setting the timer of the operation panel of the recording apparatus for automatic processing is an alternative. That is, the power source switch of the recording apparatus is turned on automatically in a time zone designated by the timer, e.g., midnight when a user does not use the recording apparatus, and if the recording apparatus detects that there is a destroyed file, the file management information 13 is restored, and the power source switch of the recording apparatus is turned off automatically upon completion of the process. Further alternatively, with the timer of the operation panel set, the file management information 13 may be automatically restored concurrently with automatic rearrangement of recording blocks.

In addition, although up to where AV data are continuous and where discontinuity starts is detected using PCR in the embodiments, this is not limiting. PTS (Presentation Time Stamp) may be used instead. This is added to a head of an access unit (which is a head of one frame in the case of video and a head of one audio frame in the case of audio) if a transport packet contains the head of the access unit. A large change in PTS can be determined as where AV data becomes discontinuous. While PCR is added to a header of a transport stream, since PTS is added inside a payload of a transport packet, to detect PTS is somewhat more complex than to detect PCR. However, it is possible to achieve an equivalent effect to that obtained using PCR. Still alternatively, PID may be used. As PID added to transport packets changes, it is possible to extract a discontinuous point in AV data.

Further, although the foregoing has described the embodiments in relation to where an example of the file management information 13 is file management information as that used in MS-DOS, Windows, etc., this is not limiting. Any file management information used in OS for allowing record in and reproduce from a hard disk can be used, such as HPFS (high performance file system) in OS/2, Mac OS, i-node in UNIX, VFAT (virtual FAT) in windows95 and NTFS (new technology file system) in WindowsNT.

Further, although the foregoing has described that the recording apparatuses according to the embodiments are for recording AV data in a hard disk, this is not limiting. Any recording medium which can be accessed randomly may be used, such as an optical magnetic disk.

Further, although the foregoing has described the embodiments in relation to a condition that a file is destroyed as a power source switch is turned off, this is not limiting. The embodiments are applicable also to where a file is destroyed because of other reason.

Further, although the foregoing has described that the STB and the recording apparatus are connected with each other via the IEEE1394 bus in each embodiment, this is not limiting. The STB and the recording apparatus may be connected with each other via other bus, such as a PCI bus, except for a IEEE1394 bus.

Further, although the foregoing has described that AV data are an MPEG2 transport stream in the embodiments, this is not limiting. Data may be any stream which contains information with which it is possible to detect a discontinuous point in AV data, such as an MPEG2 program stream, an MPEG1 stream and an MPEG4 stream.

Further, all or some functions of all or some means of the recording apparatuses according to the present invention may be realized as software using a computer program, or alternatively, as hardware.

Moreover, the present invention also covers a program recording medium which is characterized in recording a program which allows a computer to execute all or some means of the recording apparatuses according to the present invention.

As is clear from the above, the present invention provides a recording apparatus and a program recording medium with which it is possible to restore file management information so that when the file management information is destroyed or lost during recording of AV data, a portion of the AV data already recorded on the recording medium can be accessed.

What is claimed is:

1. A recording apparatus which is characterized in comprising:
   recording means which records audio visual data (hereinafter referred to as "AV data") on a recording medium; and
   file restoration means which, when file management information for managing a file recorded on said recording medium is destroyed or lost while said recording means records said AV data, restores or generates said file management information so as to make it possible to access a portion of said AV data already recorded on said recording medium by reproducing said portion of said AV data already recorded on said recording medium.

2. A recording apparatus in accordance with claim 1, characterized in that said recording means records on said recording medium an address of a top recording block in which said AV data are to be recorded, at the start of recording of said AV data,
   said AV data are recorded in continuous recording blocks of said recording medium, and
   when said file management information for managing a file recorded on said recording medium is destroyed or lost during recording of said AV data on said recording medium, said file restoration means recreates said portion already recorded based on the address of said top recording block, finds a discontinuous point, and restores or generates said file management information.

3. A recording apparatus in accordance with claim 1, characterized in that said recording means records said AV data in discontinuous recording blocks of said recording medium, and
   when said file management information for managing a file recorded on said recording medium is destroyed or lost during recording of said AV data on said recording medium, said file restoration means recreates said portion already recorded utilizing old file management information which is recorded on said recording medium, finds a discontinuous point, and restores or generates said file management information.

4. A recording apparatus in accordance with claim 3, characterized in that there is a predetermined rule regarding an order of writing in recording blocks for the purpose of writing said AV data in recording blocks of said recording medium, and
   said file restoration means recreates said portion already recorded utilizing said rule.

5. A recording apparatus in accordance with any one of claims 2 through 4, characterized in that said AV data are in compliance with MPEG, and
   said discontinuous point is a place where a value of PCR (Program Clock Reference) is discontinuous.

6. A recording apparatus in accordance with any one of claims 2 through 4, characterized in that said AV data are in compliance with MPEG, and
   said discontinuous point is a place where a value of PID (Packet Identification) is discontinuous.

7. A recording apparatus in accordance with anyone of claims 1 through 4, characterized in that said recording medium is a hard disk.

8. A program recording medium which is characterized in that said program recording medium is readable with a computer, and that said program recording medium stores a program which allows a computer to execute all or some functions of all or some means of a recording apparatus in accordance with any one of claims 1 through 4.

9. A method for recording and reproducing audio visual data comprising the steps of:
   (a) recording each audio visual data file on a recording medium;
   (b) recording a starting address of each file in a file management information region of the recording medium;
   (c) detecting discontinuities in a file when reproducing the audio visual data; and
   (d) restoring the file by using the starting address recorded in step (b), when a discontinuity is detected in step (c).

10. The method of claim 9 wherein steps (a) and (b) include recording each file in blocks of data and recording the starting address of each of the blocks of data.

* * * * *

UNITED STATES PATENT AND TRADEMARK OFFICE
CERTIFICATE OF CORRECTION

PATENT NO. : 6,862,401 B1 Page 1 of 1
APPLICATION NO. : 09/711613
DATED : March 1, 2005
INVENTOR(S) : Takashi Higashida et al.

It is certified that error appears in the above-identified patent and that said Letters Patent is hereby corrected as shown below:

Title page, item (75) Inventors, insert:
-- Yoshiki Kuno, Moriguchi (JP) --

Title page, item (56) References Cited U.S. Patent Documents, insert:
-- 5,548,757  8/1996  Matsuyama et al.

Title page, item (56) References Cited Foreign Patent Documents, insert:
-- EP 0 971 358 A  1/2000 --
-- EP 0 399 853 A  11/1990 --
-- EP 1 037 211 A  9/2000 --
-- EP 0 584 804 A  3/1994 --

Signed and Sealed this

Fifteenth Day of April, 2008

JON W. DUDAS
*Director of the United States Patent and Trademark Office*